United States Patent Office 3,196,031
Patented July 20, 1965

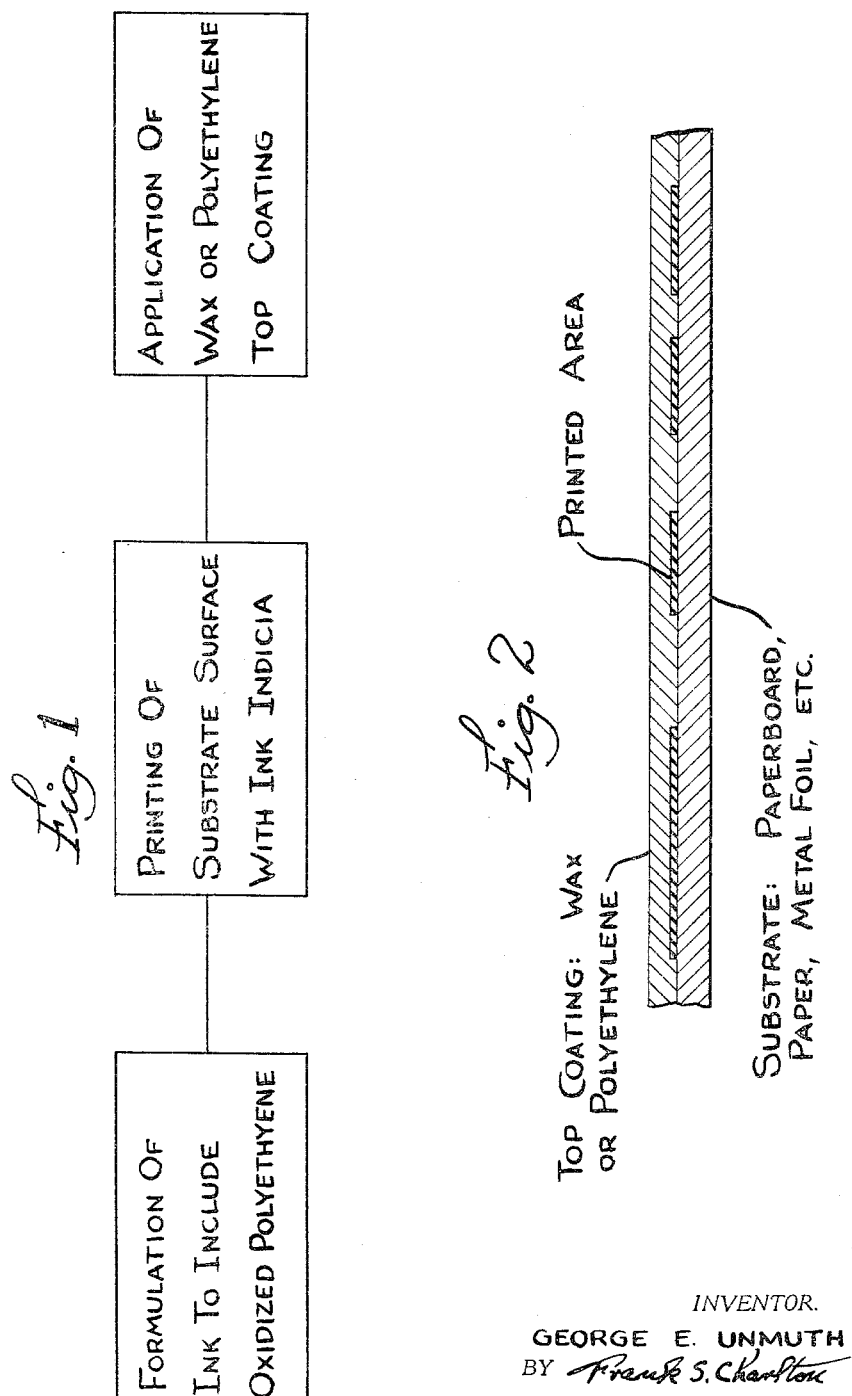

3,196,031
BONDING OF TOPCOATINGS TO PRINTED SURFACES
George Eugene Unmuth, Appleton, Wis., assignor to American Can Company, New York, N.Y., a corporation of New Jersey
Filed Oct. 13, 1961, Ser. No. 144,827
6 Claims. (Cl. 117—15)

This invention relates to the method of improving the strength of the bond formed between a printed surface and an overcoating thereon. More particularly, the invention relates to the use of printing inks having oxidized polyethylene incorporated therein to improve the strength of the bond formed between the surface of the ink when printed and a coating of material such as wax, polyethylene, etc. applied thereon. The particular printing inks and oxidized polyethylene containing compositions are formulated as described hereinafter.

PROBLEMS OF THE PRIOR ART

Frequently when wax coated printed paperboard cartons are subjected to severe temperature changes the wax tends to flake or chip off. Due to the differences between the coefficients of expansion of the wax and carton material, strains are set up which cause the wax coating to detach itself from the carton material. This problem is particularly acute in areas in which the wax is coated over printing, since the adhesion of wax to printing is often less than the adhesion of wax to unprinted paperboard. Prior to the present invention no satisfactory solution has been found.

The problem of adhesion of the wax to the printed area of wax-coated paper is acute, particularly when such printed waxed paper is laminated to a third layer such as polyethylene terephthalate, polyethylene, modified polyvinylidine chloride and cellophane. When a pulling force is exerted on the third layer, the bond between the wax and the printed surface is ruptured leaving the printed surface exposed. This problem is serious in the packaging industry where food wrappers are printed and covered with a topcoat of wax. If the wax coating is removed the wrapper loses its protective properties. When a polyolefin film is adhered to a printed paper surface the problem of adequate adhesion also arises similarly as in the case of a wax coating.

Previously various materials have been incorporated in the ink formulations in an attempt to improve the bond of topcoatings to the printed surfaces. Specially selected waxes having better heat-sealing properties increased the bond strength somewhat, but not to the desired degree. Unoxidized polyethylene in ink formulations serves to increase hardness of the printed surface and reduce the smearing when overprinting, but does not provide the required additional bond strength.

In accordance with the present invention, a marked improvement has been made in the effectiveness of the bonding of topcoatings to printed surfaces. The improvement comprises the addition of a relatively minor amount of an oxidized polyethylene, hereinafter referred to as OPE, to ink formulations employed for printing sheet materials. Comparisons of surfaces printed with ink containing OPE with those containing unoxidized polyethylene show that the strength of the bond between the printed surface and a wax topcoating is increased as much as five times in some instances.

The invention is best understood by reading the following descriptive specification in connection with the accompanying drawings, in which:

FIGURE 1 is a flow diagram of the various steps, including the formulation of the ink, application of the ink as printed indicia on a surface and application of a protective top coating over the printed surface, and FIGURE 2 is a cross-sectional view, greatly enlarged, of the printed and coated substrate.

THE INK STARTING COMPOSITIONS

The present invention utilizes a variety of inks including offset, letterpress and rotogravure inks as the ink starting compositions. The following are typical conventional ink formulae in pounds by weight.

(a) *Offset Ink composition*

| | |
|---|---:|
| Gloss varnish (phenol formaldehyde in linseed oil) | 58.13 |
| 990 varnish | 16.17 |
| Permanent 2–B red pigment | 22.80 |
| Sierra mist talc | 2.00 |
| Chlorowax 70 [1] | 1.90 |
| AC–6 polyethylene [2] | .96 |
| Microcrystalline wax | .17 |
| Paste drier (lead-manganese resinate) | 2.00 |
| Cobalt linoleate drier (5.6 percent cobalt) | 2.00 |
| Eugenol (antioxidant) | .25 |
| Total | 106.38 |

[1] Chlorinated paraffin wax containing 70% chlorine is sold by Diamond Alkali Company.
[2] AC–6 Polyethylene has a M.W. of 2000 and a density of 0.930. It is sold by Petrochemical Division, Allied Chemical Corp.

(b) *Letterpress ink compositions*

(b–1) HYDRY LETTERPRESS INK COMPOSITION

| | |
|---|---:|
| Medium chrome yellow pigment | 19.70 |
| Lithol red pigment | 10.80 |
| Modified fumaric resin | 9.60 |
| Nitrocellulose—Spirit soluble | 6.80 |
| Carbowax 1500 [1] | 7.00 |
| Aluminum silicate | 3.00 |
| Propylene glycol | 14.60 |
| Dipropylene glycol | 31.00 |
| Total | 102.50 |

[1] Polyglycol mol. wt. 500–600 and a density at 20° C. of 1.15 sold by Union Carbide Corporation.

(b–2) OXIDIZING LETTERPRESS INK COMPOSITION

| | |
|---|---:|
| Calcium carbonate white pigment | 7.50 |
| Molybdate orange pigment | 30.25 |
| Permanent 2–B red pigment | 6.00 |
| Black base | 2.00 |
| Maleic alkyd varnish Number 3 viscosity | 28.30 |
| Maleic alkyd varnish Number 8 viscosity | 2.00 |
| Number 100 white refined mineral oil | 4.30 |
| Solvent (500° petroleum) | 6.60 |
| Sierra mist talc | 1.70 |
| AC–6 polyethylene | 3.50 |
| Lead-manganese resinate drier | 2.00 |
| Cobalt drier (5.6 percent cobalt as cobalt linoleate) | 1.00 |
| Eugenol (anti-oxidant) | .25 |
| Total | 95.40 |

(c) *Rotogravure C-type ink composition*

| | |
|---|---:|
| Phenol formaldehyde resin | 40.50 |
| Petroleum soluble nitrocellulose (30 percent wet) | 58.25 |
| Red Lake C red pigment | 45.00 |
| Barium sulfate pigment | 90.00 |
| Toluene | 88.80 |
| Isopropyl acetate | 113.70 |
| Cellosolve solvent | 24.00 |
| Total | 460.25 |

Rotogravure inks are of low-viscosity having a readily volatile organic solvent vehicle and dry by evaporation of the volatile solvents. Letterpress inks are oil or varnish based inks in the case of the oxidizing type or glycol based in the hydry type. These inks are of relatively high viscosity in direct contrast to rotogravure inks. The hydry type inks dry by the action of moisture on the printing ink which acts to precipitate out the pigment and resin materials onto the printing surface allowing the glycol to penetrate into the body of the printed stock. Oxidizing letterpress inks dry by oxidation or condensation of the varnish vehicle. Offset inks, like letterpress inks, have a relatively high viscosity and employ a varnish vehicle. The particular composition of the ink employed is, of course, dependent upon the type of printing process to be used in a given instance. In each of the above compositions, a relatively large number of variations may be made in the particular components, without varying the peculiar nature or properties of the basic ink type. The above-mentioned inks represent the typical types of inks employed in the printing industry.

THE OPE INK ADDITIVE

According to the present invention, a suitably preferred composition of oxidized polyethylene is added to a selected conventional ink composition such as those hereinbefore designated.

The OPE which I have found suitable for use in my invention has a molecular weight ranging from 1500 to 2500; an acid number ranging from 12 to 18; density at 77° F. between 0.93 and 0.95; Brookfield viscosity, cp. (125° C.) 150 to 1500; ring and ball softening point 100°–110 C. The preferred OPE used in the following Examples (d) to (f) of OPE ink additive compositions had the following properties: molecular weight 2500, acid number 14.4; density (at 77° F.) 0.940; Brookfield viscosity cp. (125° C.) 1300; ring and ball softening point 105° C. This specific oxidized polyethylene is hereinafter referred to as the preferred OPE.

(d) *Additive for offset inks*

| | |
|---|---|
| Preferred OPE | 27.00 |
| Microcrystalline wax | 5.00 |
| Boiled linseed oil | 5.00 |
| Gloss varnish (phenol formaldehyde resin in linseed oil) | 46.00 |
| Specially treated linseed oil | 25.00 |
| Total | 108.00 |

In preparing the above OPE additive composition for use with the offset inks the OPE, microcrystalline wax and boiled linseed oil are heated to complete solution and mixed well. They are then added to the varnish and specially treated linseed oil, mixed in a dissolver and ground on a warm grinding mill.

(e) *Additive for letterpress inks*

(e–1) HYDRY LETTERPRESS

| | |
|---|---|
| Preferred OPE | 20.00 |
| Microcrystalline wax | 3.75 |
| Boiled linseed oil | 3.75 |
| Heatset varnish | 66.00 |
| Heatset solvent | 4.00 |
| Total | 97.50 |

In preparing the above OPE additive composition for use with the hydry letterpress inks the OPE, microcrystalline wax and boiled linseed oil are heated to complete solution and mixed well. They are then added to the heatset varnish and heatset solvent, mixed in a dissolver and ground on a warm grinding mill.

(e–2) ADDITIVE FOR OXIDIZING LETTERPRESS

| | |
|---|---|
| Preferred OPE | 27.00 |
| Microcrystalline wax | 5.00 |
| Boiled linseed oil | 5.00 |
| Gloss varnish | 46.00 |
| Specially treated linseed oil | 25.00 |
| Total | 108.00 |

The above additive composition is prepared by the same method as that employed for offset ink additives as previously set forth.

(f) *Additive for rotogravure ink (pounds)*

| | |
|---|---|
| Preferred OPE | 15.00 |
| Solox (Specially denatured ethyl alcohol containing 5% ethyl acetate and 1% aviation gasoline) | 53.00 |
| Toluene | 32.00 |
| Total | 100.00 |

In preparing the above OPE additive composition for use with the rotogravure inks the OPE is added to the toluene together with about 8 pounds of the alcohol and heated. The OPE dissolves in this solvent blend and may be precipitated as a fine dispersion by addition, with stirring, of the balance of the alcohol.

FORMULATION OF OXIDIZED POLYETHYLENE-CONTAINING INKS

The inks are prepared for printing by the intermixing of the respective components. For instance, to typical offset ink Formula (a) OPE additive (d), previously given is added. Similarly, the above OPE additives for hydry letterpress, oxidizing letterpress and rotogravure are added to the typical hydry letterpress, oxidizing letterpress and rotogravure ink formulae, respectively. The amount of OPE additive employed is typically nine pounds of the OPE additive per one hundred pounds of the of the final ink formulation. In typical offset and oxidizing letterpress ink formulations the amount of OPE is therefore 2.25 percent by weight of the final ink composition as used. Correspondingly, the amounts of OPE in hydry letterpress and rotogravure inks are 1.85 percent and 1.35 percent, by weight, respectively. Such factors as the strength of the bond required between the printed surface and the overcoating, as well as the cost of OPE and ease of formulation determine the amount of OPE employed. Although the range of amounts of OPE that are operable varies considerably, the preferred range of OPE is from .30 to 5.0 percent by weight.

The final ink as used is made by mixing the starting ink and the additive containing the OPE by suitably mixing all the components thereof to a uniform dispersion. If the pigment particles are not uniformly dispersed by simple mixing, grinding may be utilized to obtain a smooth even dispersion of uniform particle size.

PREPARATION OF COATED PRINTED SURFACES

The ink is ready for application after the formulation of the ink is completed and all of the desired components are uniformly mixed. The ink is applied to a paper base stock by the particular press for which it is best suited, i.e. offset, letterpress or rotogravure. The printed stock is then coated with wax, polyethylene, or other suitable transparent protective material depending upon the particular use of the finished sheet.

The following are typical wax coating compositions by weight:

Coating A

| | Percent |
|---|---|
| DYLT polyethlene [1] | 6 |
| 150/60 microcrystalline wax [2] | 40 |
| 135/37 paraffin wax [3] | 54 |

Coating B

| | Percent |
|---|---|
| DYLT polyethylene [1] | 10 |
| 150/60 microcrystalline wax [2] | 5 |
| 135/37 paraffin wax [3] | 85 |

Coating C

| | Percent |
|---|---|
| AG–6 polyethylene [4] | 20 |
| 150/60 microcrystalline wax [2] | 5 |
| 135/37 paraffin wax [3] | 75 |

Coating D

| | Percent |
|---|---|
| DYLT polyethylene [1] | 5 |
| Shell 700 wax [5] | 20 |
| 135/37 paraffin wax [3] | 75 |

[1] DYLT polyethylene has a M.W. of about 12,000 and a density of 0.908. It is sold by the Bakelite Company, a division of Union Carbide and Carbon Corporation.
[2] 150/60 is a microcrystalline wax having a M.P. of about 150° F. and is sold by the Quaker State Oil Company.
[3] 135/37 paraffin is a fully refined paraffin wax having a M.P. of about 135° F. sold by Standard Oil Company of Indiana.
[4] AG–6 polyethylene has a M.W. of 2000 and a density of 0.930. It is sold by Petrochemical Division, Allied Chemical Corporation.
[5] Shell 700 is a high melting hydrocarbon wax sold by Shell Oil Company.

The above illustrative wax compositions are particularly useful for coating printed paper webs by the method disclosed in U.S. Patent No. 2,753,275 and coating printed carton blanks by the method disclosed in Patent No. 2,892,735. In the case of carton blanks, wax coating which iself has a low seal strength or bond strength, is desired since the coated blanks must be readily detached from the belt on which they travel. When continuous webs are employed a wax composition with greater seal strength can be employed since the coated web can be readily removed from the surface on which it travels by merely winding it off around a drum or roll.

The following is a typical wax composition possessing a relatively high seal strength:

| | Percent |
|---|---|
| 150/60 microcrystalline wax | 10 |
| 135/37 paraffin wax | 90 |

Since wax blends of this type already have an inherently high seal strength, the amount of OPE which must be added to the ink to increase the wax-to-ink adhesion to a given value is correspondingly reduced.

This invention is not only of value in increasing the adhesion of wax coatings to printed surfaces but also in increasing the adhesion of hydrocarbon polymers such as polyethylene and the like to printed surfaces. Waxes, of course, are normally applied by dipping or spraying, while polymers such as polyethylene are usually coated by extrusion methods.

Typical polyethylenes suitable for extrusion coating include:

Alathon 16 which has a density of .923 and a melt index of 4.0. It is sold by the Du Pont Company.

Dow 610 which has a density of .916 and a melt index of 5.0. It is sold by the Dow Chemical Company.

USI 203-2 which has a density of .915 and a melt index of 8.0. It is sold by U.S. Industrial Chemicals Company.

SEAL STRENGTH TESTING METHOD

Samples for testing the bond or seal strength between the printed surface and a wax overcoating are prepared by heat sealing the coated printed surfaces in either face-to-face or face-to-back relationship. In a face-to-face seal, two strips of printed paper base stock with a coating applied over the printing are heat sealed together so that the printed surfaces face each other. A face-to-back seal is prepared by heat sealing the coated printed surface to the uncoated back of the same paper base stock. For testing a centrally-disposed 1 inch wide strip is cut from the sealed base stock.

The test method employed utilizes a Socony Vacuum Oil Company seal strength tester, which determines in grams per inch width of the sheet tested the yield force of the adhered sheets. This test is carried out at 73° F. and 50 percent relative humidity unless otherwise noted. The tester actually measures the force required to open a seal at an angle of 60°. From this measured force, the force vector at 90° is calculated in grams/inch width.

The seal strength measurement is merely the force required to open the seal and does not indicate where failure occurs. Actually, the seal can fail in several places, namely in the wax-coating, at the ink-wax interface, or in the paper stock. In the case of printed samples which are not produced according to the present invention, the failure usually occurs at the ink-wax interface and the measured force usually has a low value.

Test samples of polyethylene coated printed base stock are prepared by merely cutting specified strips from base stock having polyethylene extruded thereon. Only one strip is employed without the face-to-face and face-to-back sealing. The failure occurs either at the ink-polyethylene interface or else in the paper. A tearing of fiber indicates a strong bond at the ink-polyethylene interface.

Example I

Samples of machine coated paper stock 25 lb./ream (3000 sq. ft.) were printed on the coated side with conventional rotogravure ink composition (c), given previously. Sample stock was also printed with the same rotogravure ink modified by the addition of sufficient OPE ink additive (f), previously given, to result in a final composition containing 1.5% by weight of OPE. The printed stock was then overwaxed with wax composition Coating "A," given previously. These samples were then tested in the manner described above for seal strength with the following results:

| Seal strength, g./1 inch width | Rotogravure ink (c) | Rotogravure ink (c) with POE additive (f) |
|---|---|---|
| Slow cooled:[1] | | |
| Face-to-face— | | |
| 73° F | 43 | 340 |
| 0° F | 17 | 26 |
| Face-to-back— | | |
| 73° F | 77 | 293 |
| 0° F | 26 | 26 |
| Fast cooled:[2] | | |
| Face-to-face, 0° F | 39 | 73 |
| Face-to-back, 0° F | 34 | 55 |

[1] Slow-cooled seals are cooled by air jet at the rate of 10 f.p.m.
[2] Fast-cooled seals are cooled by dipping into a water bath (55° F.) at a rate of 50 f.p.m.

The above data indicate that the addition of OPE greatly increased the seal strength at room temperature and slightly increased it at 0° F.

Example II

Samples of machine coated paper stock 28 lbs./ream (300 sq. ft.) were printed on the coated side with conventional rotogravure ink compositions. Sample stock was also printed with the same rotogravure inks modified by the addition of sufficient OPE ink additive (f) previously given to result in a final composition containing 1.5 percent by weight of OPE. The printed stock was then overwaxed with composition coating A, given previously. These samples were then tested in the manner described above for seal strength with the following results:

| Seal strength, g./1 inch width— slow cooled | #1 Ink [1] | #2 Ink [2] | #3 Ink [3] | #4 Ink [4] |
|---|---|---|---|---|
| Face-to-back: | | | | |
| 73° F | 159 | 284 | 146 | 327 |
| 0° F | 40 | 99 | 56 | 92 |

[1] Ink #1 had the following formula in pounds:

| | |
|---|---|
| Primrose chrome yellow pigment | 34.90 |
| Lemon chrome yellow pigment | 10.60 |
| Petroleum soluble nitrocellulose (30 percent wet) | 10.90 |
| Phenol-formaldehyde resin | 7.60 |
| Oil modified sebacic acid containing 100% solids | 1.50 |
| Cellosolve solvent | 4.60 |
| Isopropyl acetate | 15.20 |
| Toluene | 14.80 |
| Total | 100.10 |

[2] Ink #2 had the same formula as Ink #1, but had added to it, based on the weight of the final formulation, 5 percent of a 15 percent solution of the preferred OPE in toluene.

[3] Ink #3 had the following formula in pounds:

| | |
|---|---|
| Calcium carbonate white pigment | 6.00 |
| Lemon chrome yellow pigment | 16.30 |
| Ferric ferro cyanide inorganic blue pigment | 8.60 |
| Carbon black dispersion | 1.00 |
| Petroleum soluble nitrocellulose | 13.10 |
| Phenol-formaldehyde resin | 9.40 |
| RG–8 plasticizer | 1.80 |
| Cellosolve solvent | 5.60 |
| Isopropyl acetate | 15.20 |
| Toluene | 14.80 |
| Total | 91.80 |

[4] Ink #4 had the same formula as Ink #3 but had added to it 5 percent by weight of the final formulation of a 15 percent solution of the preferred OPE in toluene.

The above data show the addition of preferred OPE substantially increases the bond or seal strength at both room temperature and sub-freezing temperatures.

*Example III*

A machine coated paper base stock weighing 28 lbs./ream was printed on the coated side of the paper and coated with 4 to 5 lbs./ream of wax over the printing. The rotogravure printing ink composition (c) was employed to prepare four different formulations each containing a polyethylene, and from which four different printed samples were prepared utilizing the same base stock. The samples were prepared by face-to-face sealing and the seal strengths measured. The results were as follows:

| Seal strength g./1 inch width—slow cooled | A [1] | B [2] | C [3] | D [4] |
|---|---|---|---|---|
| Face-to-face, 73°F | 70 | 441 | 476 | 465 |

[1] Ink A contained a non-oxidized non-emulsifiable polyethylene having an M.W. of 2500 and a density of .928.
[2] Ink B contained the preferred OPE.
[3] Ink C contained an oxidized, emulsifiable polyethylene having an M.W. of 1500, a density of 0.938, an acid number of 15, Brookfield viscosity at 125° C. of 375 and ring and ball softening point of 101.5°.
[4] Ink D contained an oxidized, emulsifiable polyethylene having an M.W. of 1500 and a density of .950, an acid number of 14, a Brookfield viscosity at 125° C. of 410 and a ring and ball softening point of 107° C.

The wax coating contained percent by weight:

| | Percent |
|---|---|
| DYLT Polyethylene | 6 |
| 150/60 microcrystalline wax | 40 |
| 135/37 paraffin wax | 54 |

The above data show that the use of OPE rather than unoxidized polyethylene increases the seal strength at least sixfold. This is in keeping with the fact that previous use of polyethylene in printing inks did not give the desired strength between the printed surface and the overcoating material.

*Example IV*

A machine coated paper base stock weighing 28 lbs./ream was printed on the coated side of the paper and 7 lbs./ream of polyethylene extruded thereon. One part of the base stock was printed with hydry letterpress ink composition (b–1), previously given, while the other part was printed with the same ink containing OPE additive composition (e–1), previously given, therein. The parts were separated and the seal strengths measured. The results were:

| Seal strength g./1 inch width, 73° F. | Hydry ink (b–1) | Hydry ink (b–1) containing 1.5 percent by weight of OPE |
|---|---|---|
| Maximum | 137 | [1] Paper tear 305 |
| Minimum | 15 | |

[1] Paper tear indicates that the adhesion of the polyethylene to the ink is greater than the adhesion of the paper fibers to each other.

The above data indicate that the increased strength of the bond formed between the ink and an overcoating thereon is not merely limited to wax coatings, but includes synthetic resins such as polyethylene as well. It is well to note that a comparison of the minimum values shows an increase of 1000 percent in the strength of the bond formed when OPE is employed in the printing ink.

*Example V*

Samples of machine coated paper base stock weighing 28 lbs./ream (3000 sq. ft.) were printed on the coated side of the paper with offset ink (a) previously given divided up into several portions and modified by the addition of different polyethylenes. Polyethylene was then extruded onto the printed surface on different parts of the base stock. These samples were then tested for seal strength with the following results:

| Seal strength [1] g./1 inch width, 73° F. | Minimum | Maximum | Remarks |
|---|---|---|---|
| Offset ink (a) containing polyethylene [2]. | 50 | 220 | Normal separation. |
| Offset ink (a) containing polyethylene [3]. | 195 | 375 | Do. |
| Offset ink (a) containing DYDT [4] | 85 | 295 | Do. |
| Offset ink (a) containing (d) | 390 | | Strong bond, fibre tearing. |
| Offset ink (a) containing AC–6 polyethylene [5]. | 110 | 175 | Normal separation. |
| Offset ink (a) (unmodified) | 145 | | Some fibre tear. |

[1] The angle of separation employed is 180° rather than 60°.
[2] The polyethylene used was a non-oxidized, non-emulsifiable polyethylene having an M.W. of 7000 and a denisty of .907.
[3] The polyethylene was a non-oxidized, non-emulsifiable polyethylene having an M.W. of 2500 and a density of .928.
[4] DYDT polyethylene has a M.W. of about 3000 and a density of 0.890. It is sold by the Bakelite Company, a division of Union Carbide Corporation.
[5] AC–6 polyethylene has an M.W. of 2000 and a density of 0.930. It is sold by Petroleum Division, Allied Chemical Corp.

The above data shows that OPE is vastly superior to unoxidized polyethylenes in increasing the bonding of polyethylene to ink. The unmodified ink gives a maximum which is the closest to that of the ink containing OPE. This is due to the composition of the offset ink. The particular resins and varnishes employed in the ink give the unmodified ink a greater seal strength than the unmodified letterpress or rotogravure inks.

Having now disclosed and described in detail preferred forms of our invention, it is obvious that many modifications are possible without departing from the spirit thereof. Therefore, no limitations on our inventions are intended except as specifically set forth in the appended claims.

I claim:
1. A method of increasing the adhesion of a topcoating layer selected from the group consisting of hydro- carbon waxes and polyethylene to a printed surface which comprises incorporating into a printing ink an oxidized polyethylene having a molecular weight of between 1400 and 2500, an acid number of 12 to 18, and density at 77° F. between 0.93 and 0.95, printing the ink on said surface and coating said layer on said surface.

2. The method of claim 1 wherein the amount of oxidized polyethylene incorporated is between 0.30 and 5.0 percent by weight of the resulting formulation.

3. The method of claim 1 wherein the amount of oxidized polyethylene incorporated is between 1.35 and 2.25 percent by weight of the resulting composition.

4. The method of claim 1 wherein the printing ink is selected from the group consisting of offset, letterpress and rotogravure printing inks.

5. The method of claim 1 wherein the oxidized polyethylene is incorporated in the printing ink by (a) preparing a dispersion of the oxidized polyethylene in a solvent, (b) heating said dispersion to dissolve the particles, (c) adding additional solvent to precipitate out oxidized polyethylene in the form of discrete particles, (d) adding the resulting mixture to the printing ink, and (e) stirring the mixture and the ink together.

6. A coated sheet material comprising a flexible fibrous base sheet, a printing ink selected from the group consisting of offset, rotogravure, and letterpress printing inks thereon containing an oxidized polyethylene having a molecular weight of between 1500 and 2500, an acid number of 12 to 18, and density at 77° F. between 0.93 and 0.95, and an overcoating selected from the group consisting of hydrocarbon waxes and polyethylene superposed on said printing ink.

References Cited by the Examiner

UNITED STATES PATENTS

| | | | |
|---|---|---|---|
| 2,924,538 | 2/60 | Nadelman | 117—154 |
| 3,033,707 | 5/62 | Lacy et al. | 117—76 |
| 3,043,787 | 7/62 | Bonvicini et al. | 117—38 XR |
| 3,061,882 | 11/62 | Wolinski | 117—62 XR |

RICHARD D. NEVIUS, *Primary Examiner.*